US012664930B2

(12) United States Patent
Luo et al.

(10) Patent No.: US 12,664,930 B2
(45) Date of Patent: Jun. 23, 2026

(54) DRIVING APPARATUS AND DRIVING METHOD FOR LED DISPLAY, AND LED DISPLAY

(71) Applicant: HUAWEI TECHNOLOGIES CO., LTD., Shenzhen (CN)

(72) Inventors: Kun Luo, Shenzhen (CN); Congbiao Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/674,389

(22) Filed: May 24, 2024

(65) Prior Publication Data

US 2024/0312398 A1 Sep. 19, 2024

Related U.S. Application Data

(63) Continuation of application No. PCT/CN2021/133769, filed on Nov. 27, 2021.

(51) Int. Cl.
*G09G 3/32* (2016.01)

(52) U.S. Cl.
CPC ......... *G09G 3/32* (2013.01); *G09G 2320/041* (2013.01); *G09G 2330/021* (2013.01); *G09G 2330/028* (2013.01)

(58) Field of Classification Search
CPC ............... G09G 3/32; G09G 2320/041; G09G 2330/021; G09G 2330/028; G09G 2300/0857; G09G 3/2081
See application file for complete search history.

(56) References Cited

U.S. PATENT DOCUMENTS

2005/0205880 A1 9/2005 Anzai et al.
2008/0018569 A1* 1/2008 Sung .................... G09G 3/3233 345/82
2014/0292745 A1 10/2014 Kikuchi et al.
(Continued)

FOREIGN PATENT DOCUMENTS

CN 1830096 A 9/2006
CN 103927989 A 7/2014
CN 107195273 A 9/2017
(Continued)

OTHER PUBLICATIONS

Extended European Search Report in European Appin No. 21965250.0, dated Jul. 1, 2024, 9 pages.
(Continued)

*Primary Examiner* — Andrew Sasinowski
(74) *Attorney, Agent, or Firm* — Fish & Richardson P.C.

(57) ABSTRACT

The present disclosure relates to light-emitting diode (LED) displays as well as driving methods and driving apparatuses for the LED displays. An example driving apparatus includes a temperature sensors, a control unit, and a power supply unit. The power supply unit is configured to provide a driving voltage for an LED in each pixel circuit in the LED display. The temperature sensor is configured to collect a first temperature value of the LED display. The control unit is coupled to the power supply unit, and is configured to control, based on the first temperature value, the power supply unit to dynamically adjust the driving voltage applied to the LED in each pixel circuit.

20 Claims, 4 Drawing Sheets

(56) References Cited

U.S. PATENT DOCUMENTS

2018/0330669 A1 11/2018 Zheng

FOREIGN PATENT DOCUMENTS

| | | | |
|---|---|---|---|
| CN | 108182910 | A | 6/2018 |
| CN | 109036286 | A | 12/2018 |
| CN | 110839312 | A | 2/2020 |
| CN | 111445855 | A | 7/2020 |
| CN | 112700748 | A | 4/2021 |
| JP | 2007324493 | A | 12/2007 |
| KR | 20070035388 | A | 3/2007 |

OTHER PUBLICATIONS

International Search Report and Written Opinion in International Appln. No. PCT/CN2021/133769, mailed on Jul. 1, 2022, 19 pages (with English translation).

* cited by examiner

DRIVING APPARATUS AND DRIVING METHOD FOR LED DISPLAY, AND LED DISPLAY

CROSS-REFERENCE TO RELATED APPLICATION

This application is a continuation of International Application No. PCT/CN2021/133769, filed on Nov. 27, 2021, the disclosure of which is hereby incorporated by reference in its entirety.

TECHNICAL FIELD

This application relates to the field of display technologies, and in particular, to a driving apparatus and driving method for a light-emitting diode LED display, and an LED display.

BACKGROUND

Currently, a display used in the display fields such as a mobile phone, a tablet, or a television may be any one of a liquid crystal display (LCD), an organic light-emitting diode (OLED) display, or a light-emitting diode (LED) display. For each type of display, a larger driving current value of a pixel circuit included in the display indicates larger light-emitting intensity of the display. Therefore, light-emitting luminance of the display is correspondingly higher. Compared with the LCD, the OLED display and the LED display have advantages such as high display brightness and wide color gamut to display.

Because reducing power consumption of the display may prolong battery life of a terminal device, a method for reducing power consumption of the OLED display in a conventional technology is as follows: There is a feature that a value of a driving current that flows through a pixel circuit in the OLED display changes in a large range, to ensure that a driving thin film transistor (DTFT) of the pixel circuit in the OLED display operates in a saturation mode. When the value of the driving current that flows through the pixel circuit in the OLED display is small, display brightness of the OLED display is low. Based on this, a voltage between a source and a drain of the DTFT of the pixel circuit in the OLED display may be decreased, to decrease a voltage between an operating voltage VDD of a device in the pixel circuit in the OLED display and a negative voltage VSS of the pixel circuit when the DTFT still operates in the saturation mode, in other words, the display brightness of the OLED display is ensured. Finally, power consumption of the OLED display is decreased.

However, the LED display is different from the OLED display. A color displayed on the LED display is related to a magnitude of a driving current that flows through a pixel circuit in the LED display. To ensure stability of the color displayed on the LED display, the driving current that flows through the pixel circuit in the LED display generally changes in a small range. In other words, a value of the driving current that flows through the pixel circuit in the LED display changes gently. There is no excessively large driving current value or excessively small driving current value. Therefore, the solution for reducing power consumption of the OLED display is not applicable to reducing power consumption of the LED display. In this case, a solution applicable to reducing power consumption of the LED display is required, to decrease power consumption of the LED display.

SUMMARY

This application provides a driving apparatus and driving method for a light-emitting diode LED display, and an LED display, to decrease power consumption of the LED display.

According to a first aspect, this application provides a driving apparatus for an LED display. The driving apparatus includes a temperature sensor, a control unit, and a power supply unit. The power supply unit is configured to provide a driving voltage for a light-emitting diode in each pixel circuit in the LED display. The temperature sensor is configured to collect a first temperature value of the LED display, where the first temperature value represents an average temperature value of at least one pixel circuit in the LED display. The control unit is coupled to the power supply unit, and is configured to control, based on the first temperature value, the power supply unit to dynamically adjust the driving voltage that is applied to the light-emitting diode in each pixel circuit.

In this embodiment of this application, the temperature sensor first collects the first temperature value of the LED display. The first temperature value represents the average temperature value of the at least one pixel circuit in the LED display. Then, in the control unit coupled to the power supply unit, based on the collected first temperature value of the LED display, the power supply unit is controlled to dynamically adjust the driving voltage that is applied to the light-emitting diode in each pixel circuit. In this way, based on a temperature value of the LED display in a current period of time, a voltage value applied to each pixel circuit in the LED display is determined. The driving voltage on each pixel circuit is dynamically adjusted, to adjust power consumption of the LED display.

In a possible design, each pixel circuit further includes: a current generation unit and a metal-oxide semiconductor field-effect transistor that are separately connected in series to the light-emitting diode. The current generation unit is configured to provide a constant current for the pixel circuit. The metal-oxide semiconductor field-effect transistor is configured to control the light-emitting diode to be in a conducted state or an off state. The current generation unit provides the constant current for the pixel circuit, to ensure that a value of the current that flows through the pixel circuit is constant. Therefore, after the metal-oxide semiconductor field-effect transistor is used to control the light-emitting diode to be in the conducted state, the driving voltage on each pixel circuit is adjusted, to adjust power consumption of the LED display.

In a possible design, the control unit is specifically configured to: based on the first temperature value and a preset curve relationship between a temperature value and an operating voltage of the light-emitting diode, determine a target operating voltage corresponding to a first light-emitting diode in a first pixel circuit in the LED display; and based on the target operating voltage, determine a driving voltage that is applied by the power supply unit to the first pixel circuit.

The curve relationship between the temperature value of the LED display and the operating voltage of the light-emitting diode is analyzed and collected based on an operating characteristic of the light-emitting diode in the pixel circuit in the LED display. Based on the first temperature value of the LED display collected by the temperature sensor and the curve relationship between the temperature value and the operating voltage of the light-emitting diode that is determined through analysis and statistics, the target operating voltage corresponding to the first light-emitting diode in the first pixel circuit in the LED display is obtained. Therefore, the driving voltage on the first pixel circuit that is determined based on the obtained target operating voltage can be more accurate.

In a possible design, the preset curve relationship between the temperature value and the operating voltage of the light-emitting diode is a linear relationship. The target operating voltage corresponding to the first light-emitting diode in the first pixel circuit in the LED display may be more accurately obtained based on the linear relationship between the temperature value and the operating voltage of the light-emitting diode. Therefore, the driving voltage on the first pixel circuit that is determined based on the obtained target operating voltage can be more accurate.

In a possible design, when the metal-oxide semiconductor field-effect transistor is a positive metal-oxide semiconductor field-effect transistor, a cathode of the first light-emitting diode is connected to the power supply unit. An anode of the first light-emitting diode is connected to a source of the positive metal-oxide semiconductor field-effect transistor. In another possible design, when the metal-oxide semiconductor field-effect transistor is a negative metal-oxide semiconductor field-effect transistor, an anode of the first light-emitting diode is connected to the power supply unit. A cathode of the first light-emitting diode is connected to a drain of the negative metal-oxide semiconductor field-effect transistor.

Types of the metal-oxide semiconductor field-effect transistors included in the pixel circuit are different, and connection manners between the metal-oxide semiconductor field-effect transistors and the light-emitting diodes are different. Therefore, processes in which the control unit controls the power supply unit to dynamically adjust the driving voltage that is applied to the pixel circuit are correspondingly different. Specifically, when the pixel circuit includes the positive metal-oxide semiconductor field-effect transistor, based on the target operating voltage, the control unit determines a driving voltage that is applied by the power supply unit to the cathode of the first light-emitting diode in the first pixel circuit. When the pixel circuit includes the negative metal-oxide semiconductor field-effect transistor, based on the target operating voltage, the control unit determines a driving voltage that is applied by the power supply unit to the anode of the first light-emitting diode in the first pixel circuit. In this way, based on a specific type of the metal-oxide semiconductor field-effect transistor included in the pixel circuit and a specific connection manner between the metal-oxide semiconductor field-effect transistor and the light-emitting diode, the driving voltage can be more accurately applied to the anode or the cathode of the light-emitting diode in each pixel circuit by using the power supply unit.

In a possible design, there are a plurality of temperature sensors. The plurality of temperature sensors are respectively disposed at different positions on the LED display. When there are two temperature sensors, the two temperature sensors are respectively disposed at diagonal positions on the LED display. Alternatively, when there are four temperature sensors, the four temperature sensors are respectively disposed at four corners of the LED display. The first temperature values of the LED display are collected by the temperature sensors located at the plurality of different positions on the LED display, so that an equalization temperature value of the LED display at a current moment can be more accurately determined.

According to a second aspect, this application further provides an LED display, including a plurality of pixel circuits and the driving apparatus for an LED display according to the first aspect and any design of the first aspect. The driving apparatus is connected to the plurality of pixel circuits separately.

According to a third aspect, this application provides a driving method for a light-emitting diode LED display. The method includes: receiving a first temperature value of the LED display collected by a temperature sensor, where the first temperature value represents an average temperature value of at least one pixel circuit in the LED display; and based on the first temperature value, controlling a power supply unit to dynamically adjust a driving voltage that is applied to a light-emitting diode in each pixel circuit in the LED display.

In a possible design, each pixel circuit includes the light-emitting diode. That based on the first temperature value, controlling a power supply unit to dynamically adjust a driving voltage that is applied to a light-emitting diode in each pixel circuit in the LED display includes: Based on the first temperature value and a preset curve relationship between a temperature value and an operating voltage of the light-emitting diode, determine a target operating voltage corresponding to a first light-emitting diode in a first pixel circuit in the LED display; and based on the target operating voltage, determine a driving voltage that is applied by the power supply unit to the first pixel circuit.

In a possible design, the preset curve relationship between the temperature value and the operating voltage of the light-emitting diode is a linear relationship.

In a possible design, each pixel circuit further includes a positive metal-oxide semiconductor field-effect transistor. A cathode of the first light-emitting diode is connected to the power supply unit. An anode of the first light-emitting diode is connected to a source of the positive metal-oxide semiconductor field-effect transistor. That based on the target operating voltage, determine a driving voltage that is applied by the power supply unit to the first pixel circuit includes: Based on the target operating voltage, determine a driving voltage that is applied by the power supply unit to the cathode of the first light-emitting diode in the first pixel circuit.

In a possible design, each pixel circuit further includes a negative metal-oxide semiconductor field-effect transistor. An anode of the first light-emitting diode is connected to the power supply unit. A cathode of the first light-emitting diode is connected to a drain of the negative metal-oxide semiconductor field-effect transistor. That based on the target operating voltage, determine a driving voltage that is applied by the power supply unit to the first pixel circuit includes: Based on the target operating voltage, determine a driving voltage that is applied by the power supply unit to the anode of the first light-emitting diode in the first pixel circuit.

According to a fourth aspect, this application provides a computer-readable storage medium. The computer-readable storage medium stores computer instructions. When the computer instructions are executed, the method in any design of the third aspect may be performed.

According to a fifth aspect, this application provides a computer program product. The computer program product includes computer instructions. When the computer instructions are executed, the method in any design of the third aspect may be performed.

For technical effects that can be achieved by any possible design of any one of the second aspect to the fifth aspect, refer to descriptions of technical effects that can be achieved in any possible design of the first aspect. Details are not described herein.

DESCRIPTION OF EMBODIMENTS

Figure 1:
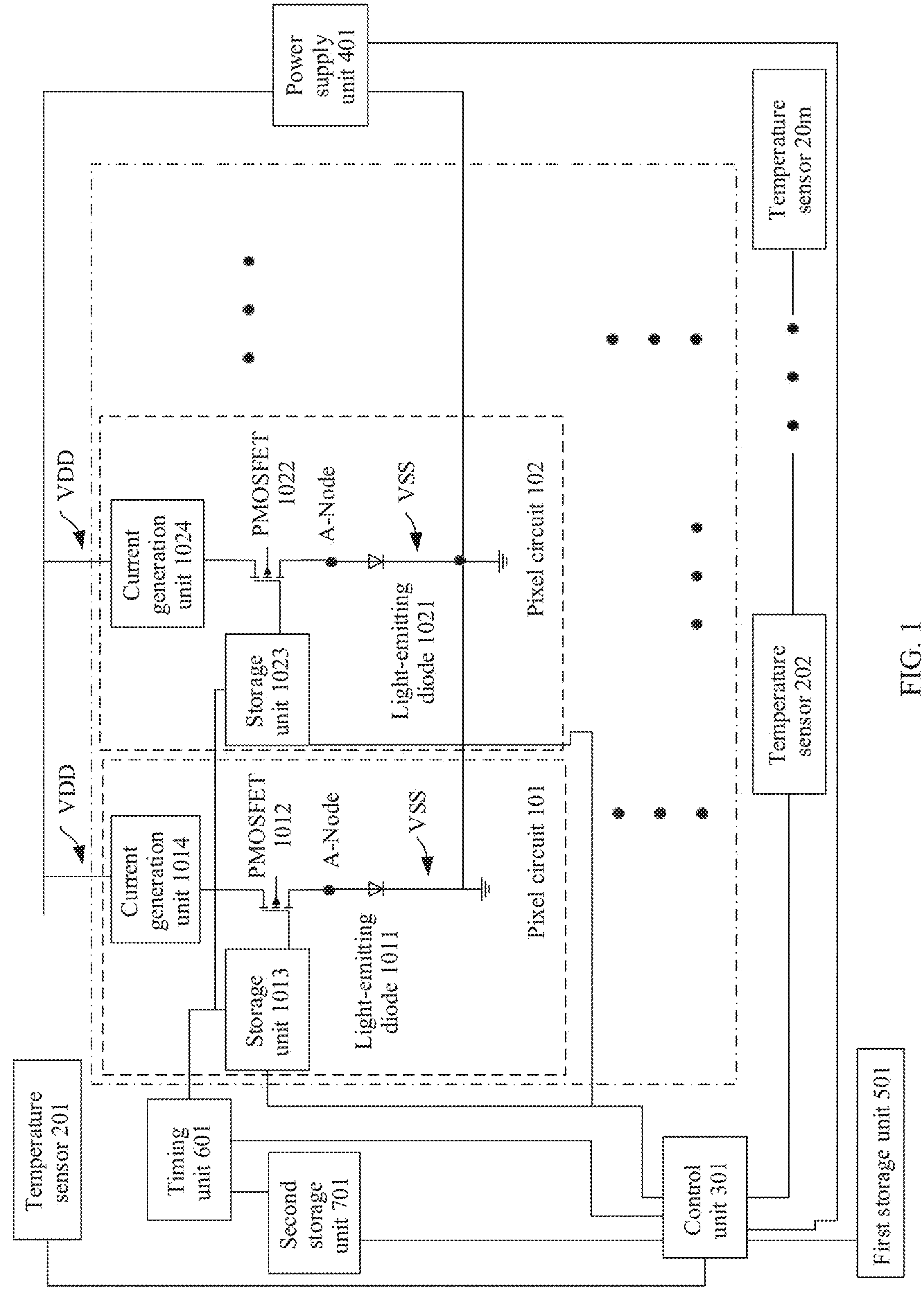
FIG. 1 is a schematic diagram of a structure of a connection between a driving apparatus for an LED display, an LED display, and a signal driving apparatus of an LED display according to an embodiment of this application.

Currently, a display used in display fields such as a mobile phone, a tablet, or a television may be any one of an LCD, an OLED display, or an LED display. For each type of display, a larger driving current value of a pixel circuit included in the display indicates larger light-emitting intensity of the display. Therefore, light-emitting luminance of the display is correspondingly higher. Compared with the LCD, the OLED display and the LED display have advantages such as high display brightness and wide color gamut to display.

As described in the background, a method for reducing power consumption of the OLED display is generally as follows: There is a feature that a value of a driving current that flows through a pixel circuit in the OLED display changes in a large range. Based on this, a voltage between a source and a drain of a DTFT of the pixel circuit in the OLED display may be decreased, to decrease power consumption of the OLED display when the display brightness of the OLED display is ensured. However, the LED display is different from the OLED display. A color displayed on the LED display is related to a magnitude of a driving current that flows through a pixel circuit in the LED display. To ensure stability of the color displayed on the LED display, the driving current that flows through the pixel circuit in the LED display generally changes in a small range. There is no excessively large driving current value or excessively small driving current value that flows through the pixel circuit in the LED display. Therefore, the solution for reducing power consumption of the OLED display is not applicable to reducing power consumption of the LED display. In this case, a solution applicable to reducing power consumption of the LED display is required, to decrease power consumption of the LED display.

In view of this, embodiments of this application provide a driving apparatus and driving method for a light-emitting diode LED display, and an LED display. To make the objectives, technical solutions, and advantages of this application clearer, the following further describes this application in detail with reference to the accompanying drawings.

It should be noted that, in the description of this application, "at least two" means two or more, and "a plurality of" means more than two. In view of this, in embodiments of this application, "a plurality of" may alternatively be understood as "at least three". A term "and/or" describes an association relationship between associated objects and indicates that three relationships may exist. For example, "A and/or B" may indicate the following three cases: Only A exists, both A and B exist, and only B exists. In addition, a character "/", unless otherwise specified, generally indicates an "or" relationship between the associated objects. In addition, it should be understood that in the description of this application, the terms such as "first" and "second" are merely used for distinguishing and description, but shall not be understood as indicating or implying relative importance, or shall not be understood as indicating or implying a sequence.

Figure 1A:
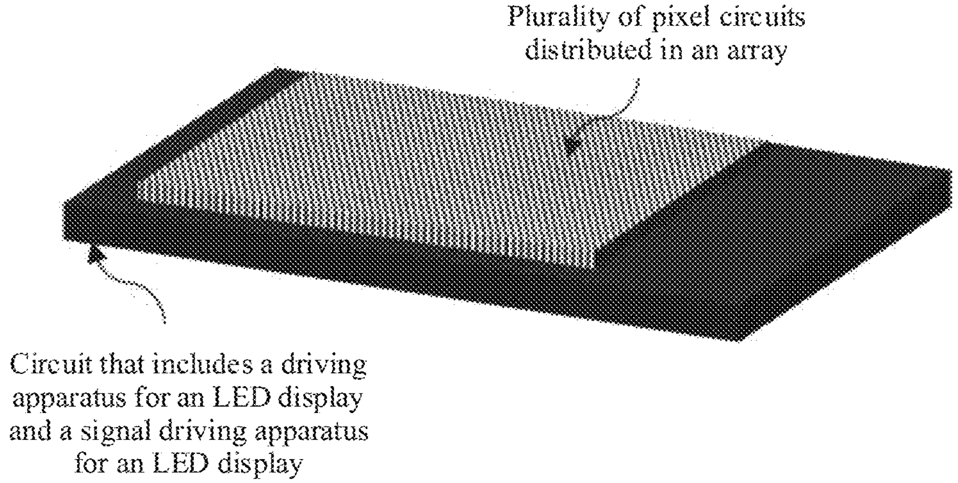
FIG. 1*a* is a schematic diagram of a structure in which a plurality of pixel circuits distributed in an array are connected, through a metal conducting wire, to a circuit that includes a driving apparatus for an LED display and a signal driving apparatus of an LED display according to an embodiment of this application.

FIG. 1 is a schematic diagram of a structure of a connection between a driving apparatus for an LED display, an LED display, and a signal driving apparatus of an LED display according to an embodiment of this application. The LED display includes a plurality of pixel circuits that are distributed in rows and columns, for example, includes a pixel circuit 101, a pixel circuit 102, . . . , and a pixel circuit 10*n* (n is a positive integer) in a same row (the pixel circuit 10*n* is not shown in FIG. 1). The plurality of pixel circuits are distributed in an array in a horizontal direction and a vertical direction in the LED display. FIG. 1 shows only a small part of pixel circuits. A plurality of black spots separately represent the plurality of pixel circuits that are distributed in the array. Specifically, FIG. 1*a* is a schematic diagram of a structure in which a plurality of pixel circuits distributed in an array are connected, through a metal conducting wire, to a circuit that includes a driving apparatus for an LED display and a signal driving apparatus of an LED display according to an embodiment of this application. The driving apparatus for an LED display includes a temperature sensor (for example, a temperature sensor 201, a temperature sensor 202, . . . , and a temperature sensor 20*m* (m is a positive integer) shown in FIG. 1), a control unit 301, and a power supply unit 401. The temperature sensor 201, the temperature sensor 202, . . . , and the temperature sensor 20*m*, and the power supply unit 401 are all connected to the control unit 301. The power supply unit 401 is further connected to VDDs and VSSs separately corresponding to the plurality of pixel circuits distributed in the array, such as the pixel circuit 101, the pixel circuit 102, . . . , and the pixel circuit 10*n*. Herein, a specific quantity of temperature sensors is not limited in this application. There may be one or more temperature sensors.

A first temperature value of the LED display collected by the temperature sensor may represent an average temperature value of at least one pixel circuit in the LED display. In addition, when there are the plurality of temperature sensors, the plurality of temperature sensors are separately disposed at different positions on the LED display, to separately collect temperature values at the different positions on the LED display, and respectively send the plurality of temperature values that are collected to the control unit 301. For example, when there are two temperature sensors, the two temperature sensors may be respectively disposed at diagonal positions on the LED display. When there are four temperature sensors, the four temperature sensors may be separately disposed at four corners of the LED display. When there are N temperature sensors (N is a positive integer greater than 4), the four temperature sensors may be separately disposed at the four corners of the LED display. Remaining N−4 temperature sensors are distributed at a specified interval distance from a temperature sensor at any corner of the LED display. Herein, only an example is used to describe the quantity of temperature sensors that collect the temperature of the LED display, and a position relationship between the plurality of temperature sensors. Specific positions of the plurality of temperature sensors are not limited in this application, and may be adjusted based on an actual application.

The power supply unit 401 provides a driving voltage for a light-emitting diode in each pixel circuit in the LED display. Based on the first temperature value collected by the temperature sensor, the control unit 301 controls the power supply unit 401 to dynamically adjust the driving voltage that is applied to the light-emitting diode in each pixel circuit.

Generally, each pixel circuit includes one light-emitting diode. As shown in FIG. 1, the pixel circuit 101 includes a light-emitting diode 1011, and the pixel circuit 102 includes a light-emitting diode 1021. Based on the first temperature value and a preset curve relationship between a temperature value and an operating voltage of the light-emitting diode, the control unit 301 may determine a target operating voltage corresponding to a first light-emitting diode in a first pixel circuit in the LED display. Then, based on the obtained target operating voltage, the control unit 301 determines a driving voltage that is applied by the power supply unit 401 to the first pixel circuit. For example, the preset curve relationship between the temperature value and the operating voltage of the light-emitting diode may be a rule obtained by artificially performing big data analysis and statistics on a large quantity of learned temperature values of displays and operating voltages of light-emitting diodes in pixel circuits in advance. The rule is represented through one curve relationship. For example, the preset curve relationship between the temperature value and the operating voltage of the light-emitting diode is a linear relationship. Herein, the first pixel circuit may be any one of the plurality of pixel circuits in the LED display. For example, the first pixel circuit is the pixel circuit 101 in FIG. 1.

When there are the plurality of temperature sensors, the control unit 301 determines the first temperature value of the LED display based on second temperature values collected by the plurality of temperature sensors. Then, based on the first temperature value and the preset curve relationship between the temperature value and the operating voltage of the light-emitting diode, the control unit 301 determines the target operating voltage corresponding to the first light-emitting diode in the first pixel circuit in the LED display. Then, based on the obtained target operating voltage, the control unit 301 determines the driving voltage that is applied by the power supply unit 401 to the first pixel circuit.

Specifically, when there are the plurality of temperature sensors, the first temperature value of the LED display is determined in any one of the following manners.

1. Use a minimum temperature value among the second temperature values that are respectively collected by the plurality of temperature sensors as the first temperature value. For example, it is assumed that there are m temperature sensors. As shown in FIG. 1, a second temperature value of the LED display collected by the temperature sensor 201 is A1. A second temperature value of the LED display collected by the temperature sensor 202 is A2. A second temperature value of the LED display collected by the temperature sensor **20*m*** is Am. In addition, the second temperature value A1 is the minimum temperature value. In this case, a first temperature value A of the LED display=A1.

2. Use an average value of the second temperature values that are respectively collected by the plurality of temperature sensors as the first temperature value. For example, it is assumed that there are m temperature sensors. As shown in FIG. 1, a second temperature value of the LED display collected by the temperature sensor 201 is B1. A second temperature value of the LED display collected by the temperature sensor 202 is B2. A second temperature value of the LED display collected by the temperature sensor **20*m*** is Bm. In this case, a first temperature value B of the LED display=(B1+B2+ . . . +Bm)/m.

3. Use a temperature value obtained through weighted summation of the second temperature values that are respectively collected by the plurality of temperature sensors as the first temperature value. For example, it is still assumed that there are m temperature sensors. As shown in FIG. 1, a second temperature value of the LED display collected by the temperature sensor 201 is C1. A second temperature value of the LED display collected by the temperature sensor 202 is C2. A second temperature value of the LED display collected by the temperature sensor **20*m* is Cm. In addition, a weight value corresponding to the second temperature value C1 is 0.1. A weight value corresponding to the second temperature value C2 is 0.3. A weight value corresponding to the second temperature value Cm is 0.1. In this case, a first temperature value C of the LED display=C1×0.1+C2×0.3+ . . . +Cm×0.1. Herein, a sum of the weight value corresponding to the second temperature value C1 that is collected by the temperature sensor 201, the weight value corresponding to the second temperature value C2 that is collected by the temperature sensor 202, . . . , and the weight value corresponding to the second temperature value Cm that is collected by the temperature sensor 20*m*** is 1.

In addition to the foregoing three implementations, the control unit 301 may alternatively determine the first temperature value of the LED display in another manner. This is not specifically limited herein in this application.

Figure 2:
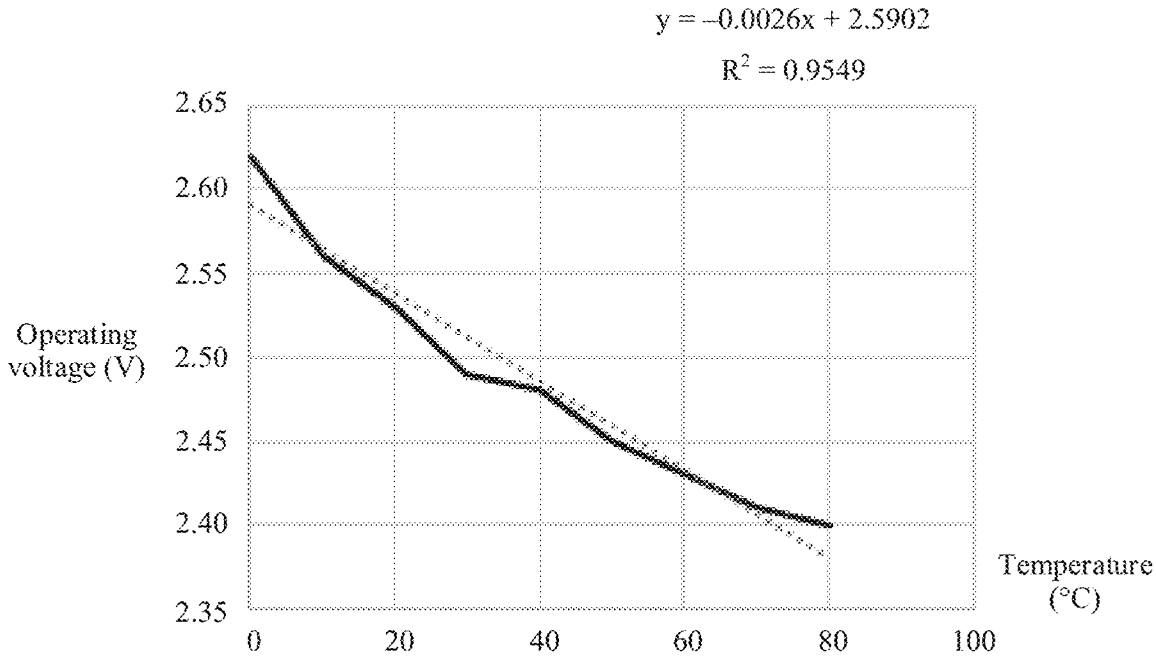
FIG. 2 is a schematic diagram of a curve relationship between an operating voltage of a green light LED and a temperature value according to an embodiment of this application.

The operating voltage of the light-emitting diode changes with a temperature change of the LED display. FIG. 2 is a schematic diagram of a curve relationship between an operating voltage of a green light LED and a temperature value according to an embodiment of this application. The curve relationship is a rule obtained by artificially performing big data analysis and statistics on a large quantity of learned temperature values of displays and operating voltages of light-emitting diodes in pixel circuits in advance. It can be learned from FIG. 2 that the curve relationship between the operating voltage of the green light LED and the temperature value is $y=-0.0026x+2.59$. x represents the temperature, and y represents the operating voltage of the green light LED. In addition, a fitting degree $R^2$ in a linear fitting relationship between the operating voltage of the green light LED and the temperature value is 0.9549. The curve relationship is a linear relationship. This is merely an example for description, and a specific type of the curve relationship is not limited in this application. For example, for the green light LED, when a temperature of a green light LED display increases by 1° C., the operating voltage of the green light LED decreases by 2.6 mV. In other words, when brightness or displayed content of the green light LED display increases, the temperature value of the green light LED display increases, and correspondingly an operating voltage of the green light LED display decreases. Therefore, after a first temperature value of the green light LED display is determined, a target operating voltage of the green light-emitting diode may be obtained based on the first temperature value and the curve relationship shown in FIG. 2. Then, a driving voltage applied to a pixel circuit is determined based on a difference between a target operating voltage of the green light-emitting diode at a current moment and a target operating voltage of the green light-emitting diode at a moment before the current moment.

Specifically, each pixel circuit generally further includes a positive metal-oxide semiconductor field-effect transistor (Positive metal-oxide semiconductor Field-Effect Transistor, PMOSFET), a storage unit, and a current generation unit. The pixel circuit 101 shown in FIG. 1 further includes a PMOSFET 1012, a storage unit 1013, and a current generation unit 1014. The pixel circuit 102 further includes a PMOSFET 1022, a storage unit 1023, and a current generation unit 1024.

The pixel circuit 101 is used as an example for description. A cathode of the light-emitting diode 1011 is connected to the power supply unit 401 and the ground. An anode of the light-emitting diode 1011 is connected to a source of the PMOSFET 1012. A gate of the PMOSFET 1012 is connected to the storage unit 1013. A drain of the PMOSFET 1012 is connected to the current generation unit 1014. The current generation unit 1014 is further connected to the power supply unit 401. The storage unit 1013 is configured to store a pulse width modulation (Pulse width modulation, PWM) signal that drives the pixel circuit. The current generation unit 1014 is configured to generate a constant current by using a current mirror, to provide the constant current for the pixel circuit. In the pixel circuit 101, after the power supply unit 401 applies a voltage with a specified voltage value to the pixel circuit 101, the current generation unit 1014 generates a constant current I. As a control switch of the pixel circuit 101, the PMOSFET 1012 controls the constant current I to flow through the light-emitting diode 1011, and uses a duty cycle of the PWM signal stored in the storage unit 1013, to determine conducted time and off time of the PMOSFET 1012. For example, when the duty cycle of the PWM signal is larger, brightness of the light-emitting diode 1011 sensed by a human eye is larger. In this case, the PMOSFET 1012 may be cut off, to decrease the brightness of the light-emitting diode 1011. Herein, a specific process of determining the PWM signal stored in the storage unit 1013 is described subsequently. Details are not described herein.

For the pixel circuit 101, it is assumed that voltages applied by the power supply unit 401 to the pixel circuit 101 are VDD and VSS respectively. In this case, a power P of the pixel circuit 101=I×(VDD−VSS), and an operating voltage $V_{led}$ of the light-emitting diode 1011=$V_{A\text{-}Node}$−VSS. Therefore, the power of the pixel circuit 101 may also be represented as P=I×(VDD+$V_{led}$−$V_{A\text{-}Node}$). If a current I in the pixel circuit 101 is the constant current, and values of $V_{A\text{-}Node}$ and VDD remain unchanged, when a value of $V_{led}$ decreases (that is, a value of VSS is increased), the power of the pixel circuit 101 decreases. For example, a difference between a target operating voltage $V_{led\text{-}1}$ of the light-emitting diode 1011 at a current moment and a target operating voltage $V_{led\text{-}2}$ of the light-emitting diode 1011 at a moment before the current moment may be used as a voltage value that needs to be increased by the driving voltage VSS. Herein, for a specific connection manner and a circuit implementation principle of the pixel circuit 102 and a device in another pixel circuit that is not shown in FIG. 1, refer to the description of the pixel circuit 101.

Figure 3:
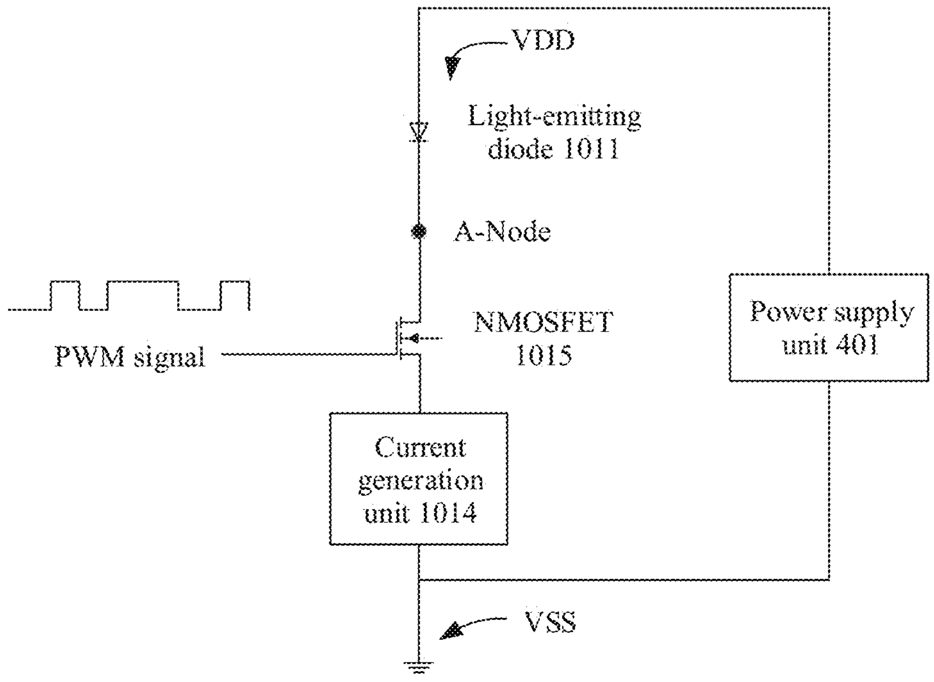
FIG. 3 is a schematic diagram of a structure of a pixel circuit according to an embodiment of this application.

In an embodiment of this application, when types of metal-oxide semiconductor field-effect transistors included in the pixel circuit are different, connection manners between the metal-oxide semiconductor field-effect transistors and the light-emitting diodes are different. For example, when the PMOSFET included in each pixel circuit is replaced with a negative metal-oxide semiconductor field-effect transistor((Negative metal oxide semiconductor Field-Effect Transistor, NMOSFET), a connection manner between the NMOSFET and the light-emitting diode in the pixel circuit is different from the foregoing described connection manner between the PMOSFET and the light-emitting diode in the pixel circuit. The pixel circuit 101 is used as an example for description. FIG. 3 is a schematic diagram of a structure of a specific connection of a pixel circuit 101 that includes an NMOSFET 1015 according to an embodiment of this application. An anode of the light-emitting diode 1011 is connected to the power supply unit 401. A cathode of the light-emitting diode 1011 is connected to a drain of the NMOSFET 1015. A gate of the NMOSFET 1015 is connected to the storage unit 1013 (not shown in FIG. 3). A source of the NMOSFET 1015 is connected to the current generation unit 1014. The current generation unit 1014 is further connected to the power supply unit 401. Specific function implementations of the storage unit 1013 and the current generation unit 1014 herein are the same as the specific function implementations of the storage unit 1013 and the current generation unit 1014 when the pixel circuit 101 includes the PMOSFET 1012. Details are not described herein.

As shown in FIG. 3, for the pixel circuit 101, it is assumed that voltages applied by the power supply unit 401 to the pixel circuit 101 are VDD and VSS respectively. In this case, a power P of the pixel circuit 101=I×(VDD−VSS), and an operating voltage $V_{led}$ of the light-emitting diode 1011=VDD−$V_{A\text{-}Node}$. Therefore, the power of the pixel circuit 101 may also be represented as P=I×($V_{led}$+$V_{A\text{-}Node}$−VSS). If a current I in the pixel circuit 101 is a constant current, and values of $V_{A\text{-}Node}$ and VSS remain unchanged, when a value of $V_{led}$ decreases (that is, a value of VDD is decreased), the power of the pixel circuit 101 decreases. For example, a difference between a target operating voltage $V_{led\text{-}1}$ of the light-emitting diode 1011 at a current moment and a target operating voltage $V_{led\text{-}2}$ of the light-emitting diode 1011 at a moment before the current moment may be used as a voltage value that needs to be decreased by the driving voltage VDD.

In an embodiment of this application, as shown in FIG. 1, the driving apparatus for an LED display may further include a first storage unit 501. The first storage unit 501 is configured to store an initial VDD and an initial VSS that are applied by the power supply unit 401 to each pixel circuit. Specifically, after obtaining the initial VDD and the initial VSS that are of each pixel circuit and that are stored in the first storage unit 501, the control unit 301 controls the power supply unit 401, to adjust the driving voltage that is applied to each pixel circuit to the initial VDD and the initial VSS. Then, the LED display starts to display an image.

In an embodiment of this application, when the pixel circuit includes the PMOSFET, a constituent material of the PMOSFET may be a silicon metal-oxide semiconductor. When the pixel circuit includes the NMOSFET, a constituent material of the NMOSFET may be a silicon metal-oxide semiconductor. In addition, the light-emitting diode included in the pixel circuit may alternatively be a micro light-emitting diode (Micro light-emitting diode, Micro LED). When the pixel circuit includes one micro LED, the pixel circuit is combined with the driving apparatus for an LED display, in addition to being applied to a scenario like a television or a notebook with a large display, and may be further applied to a scenario like a wearable augmented reality (augmented reality, AR) with a small display. For example, the pixel circuit and the driving apparatus for an LED display are applied to a scenario like a watch, augmented reality display glasses, or virtual reality display glasses with the small display.

After a specific implementation of the driving apparatus for an LED display provided in this application is described, the following describes a process in which the signal driving apparatus of the LED display drives the LED display to display the image.

As shown in FIG. 1, the signal driving apparatus of the LED display includes a timing unit 601 and a second storage unit 701. The second storage unit 701 stores a to-be-displayed image on the LED display. In addition to being connected to the second storage unit 701, the timing unit 601 in the signal driving apparatus of the LED display is further connected to the control unit 301 in the driving apparatus for an LED display and the storage unit (for example, the storage unit 1013) in each pixel circuit in the LED display. The second storage unit 701 in the signal driving apparatus of the LED display is further connected to the control unit 301 in the driving apparatus for an LED display.

In addition to the function implementation described above in the driving apparatus for an LED display, the control unit 301 may further send a timing signal instruction to the timing unit 601. After obtaining the to-be-displayed image of the LED display stored in the second storage unit 701, based on each pixel of the to-be-displayed image of the LED display stored in the second storage unit 701, the control unit 301 generates a pixel data signal corresponding to each pixel. Then, after the timing unit 601 generates the timing signal based on the timing signal instruction, according to a specified operation rule, the control unit 301 separately performs operation on the timing signal and the pixel data signal corresponding to each pixel, to obtain a PWM signal corresponding to a pixel circuit of each pixel. Each pixel circuit in the LED display shares a same group of timing signals that are generated by the timing unit 601. Herein, the specified operation rule may be an AND operation.

After the PWM signal corresponding to each pixel circuit is determined, by using the PWM signal corresponding to each pixel circuit, each pixel circuit adjusts conducted time and off time of a metal-oxide semiconductor field-effect transistor included in the pixel circuit. In this way, the light-emitting diode in the pixel circuit emits light, and finally the LED display displays the image.

The control unit 301 may perform scanning row by row on each pixel of the to-be-displayed image that is stored in the second storage unit 701 and that is of the LED display. To be specific, pixels are scanned one by one from left to right and from top to bottom, and finally the pixel data signal corresponding to each pixel is generated.

Figure 4:
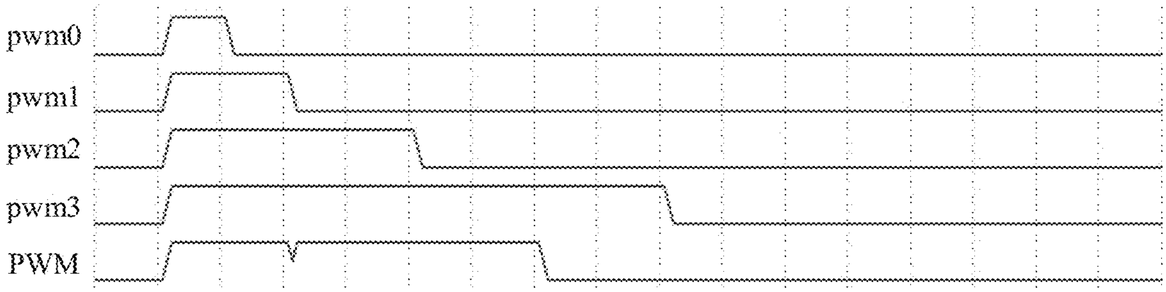
FIG. 4 is a schematic diagram of a timing signal and a PWM signal according to an embodiment of this application.

As shown in FIG. 4, it is assumed that the timing signal generated by the timing unit 601 is 4 bits, and is represented by pwm0, pwm1, pwm2, and pwm3. A duty cycle of a timing signal of the pwm0 is 1/16. A duty cycle of a timing signal of the pwm1 is 2/16. A duty cycle of a timing signal of the pwm2 is 4/16. A duty cycle of a timing signal of the pwm3 is 8/16. If one pixel data signal is 0110, a PWM signal obtained by performing the AND operation on the pixel data signal and the 4-bits timing signal includes pwm1 and pwm2. That is, a PWM signal in FIG. 4. It can be learned from FIG. 4 that the 4-bits timing signal may display 15 pieces of gray-scale information. After the operation is performed on the 4-bits timing signal and the pixel data signal, six pieces of gray-scale information may be displayed. Herein, both the timing signal and the pixel data signal may be in 2 bits to 12 bits.

Figure 5:
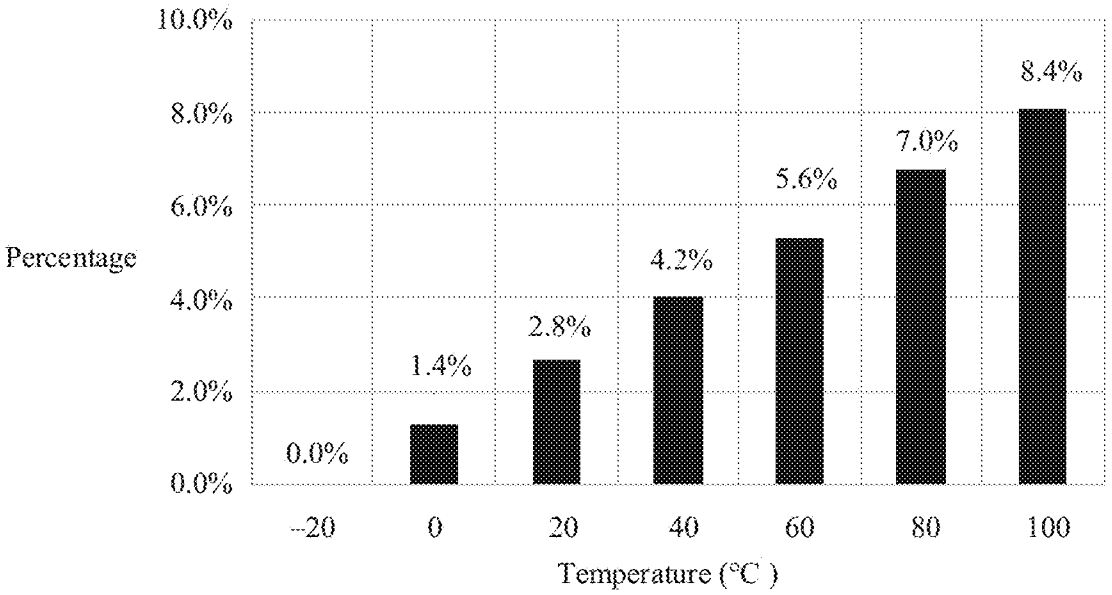
FIG. 5 is a schematic percentage diagram of decrease of power consumption of a green light LED display at different temperatures according to an embodiment of this application.

For example, an example in which the green light LED display includes a plurality of pixel circuits 101 is used, to describe a process of reducing power consumption of the green light LED display by using the foregoing driving apparatus for an LED display when the green light LED display displays an image. It is assumed that VDD in each pixel circuit 101 is 1.1 V, an initial voltage value of VSS is −2.6 V, and the metal-oxide semiconductor field-effect transistor included in each pixel circuit 101 is the PMOSFET. When the temperature value of the green light LED display is −20° C., according to the rule obtained by performing big data analysis and statistics on a large quantity of learned temperature values of displays and operating voltages of light-emitting diodes in pixel circuits in advance, it is determined that the operating voltage of the green light LED is approximately 2.642 V. It can be learned from FIG. 2 that, when the temperature value of the green light LED display increases by 1° C., the operating voltage of the green light LED decreases by 2.6 mV. Therefore, based on the foregoing description, when the temperature value of the green light LED display increases by 1° C., the voltage value of VSS is increased by 2.6 mV correspondingly, to decrease power consumption of the green light LED display. As shown in FIG. 5, when the temperature value of the green light LED display is 0° C., power consumption of the green light LED display may decrease by 1.4%. When the temperature value of the green light LED display is 20° C., power consumption of the green light LED display may decrease by 2.8%. When the temperature value of the green light LED display is 40° C., power consumption of the green light LED display may decrease by 4.2%. When the temperature value of the green light LED display is 60° C., power consumption of the green light LED display may decrease by 5.6%. When the temperature value of the green light LED display is 80° C., power consumption of the green light LED display may decrease by 7.0%. When the temperature value of the green light LED display is 100° C., power consumption of the green light LED display may decrease by 8.4%.

Figure 6:
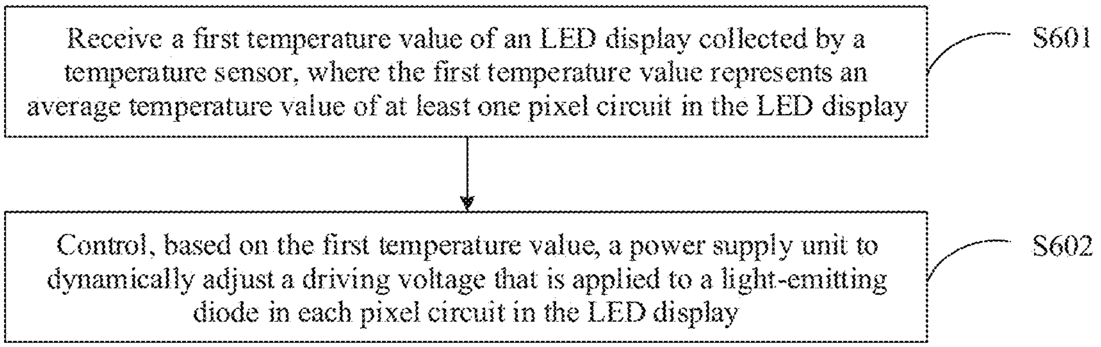
FIG. 6 is a schematic flowchart of a driving method for an LED display according to an embodiment of this application.

Based on the foregoing embodiments of the driving apparatus for an LED display, an embodiment of this application further provides a driving method for the LED display. The method may be performed by the control unit 301 in FIG. 1. As shown in FIG. 6, the method includes the following steps.

S601: Receive a first temperature value of the LED display collected by a temperature sensor, where the first temperature value represents an average temperature value of at least one pixel circuit in the LED display.

S602: Control, based on the first temperature value, a power supply unit to dynamically adjust a driving voltage that is applied to a light-emitting diode in each pixel circuit in the LED display.

Specifically, each pixel circuit includes the light-emitting diode. Based on the first temperature value and a preset curve relationship between a temperature value and an operating voltage of the light-emitting diode, a target operating voltage corresponding to a first light-emitting diode in a first pixel circuit in the LED display is determined. Based on the target operating voltage, a driving voltage applied by the power supply unit to the first pixel circuit is determined. The preset curve relationship between the temperature value and the operating voltage of the light-emitting diode is a linear relationship.

Figure 7:
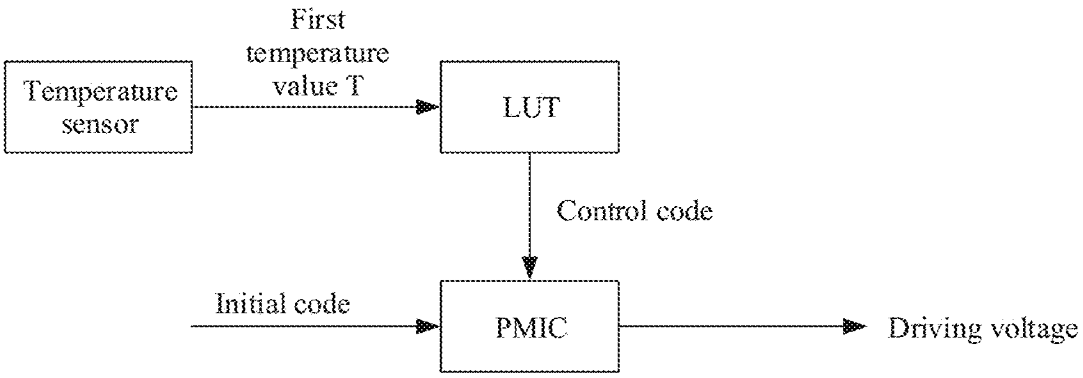
FIG. 7 is a schematic flowchart of determining a driving voltage applied to each pixel circuit according to an embodiment of this application.

For example, as shown in FIG. 7, it is assumed that after the first temperature value T of the LED display is determined by using the temperature sensor, the target operating voltage of the light-emitting diode 1011 in the pixel circuit 101 in FIG. 1 is first determined based on the first temperature value T and the preset curve relationship between the temperature value and the operating voltage of the light-emitting diode. Then, a driving voltage applied to the pixel circuit 101 is determined based on a difference between a target operating voltage of the light-emitting diode 1011 at a current moment and a target operating voltage of the light-emitting diode 1011 at a moment before the current moment. Then, a control code corresponding to the driving voltage is determined based on a pre-constructed correspondence lookup table (Lookup table, LUT) between the driving voltage and the control code (Code). Finally, the control code corresponding to the driving voltage is input into the power supply unit 401. In this way, based on the control code, the power supply unit 401 outputs the driving voltage that is applied to the pixel circuit 101. The driving voltage herein may be the VDD or the VSS in FIG. 1. The power supply unit 401 may be a power management integrated circuit (PMIC). The correspondence between the control code and the driving voltage may be determined based on a specification of the PMIC. In addition, an initial code corresponding to an initial voltage value that is input to the PMIC may be further set. Table 1 shows a correspondence LUT between control codes and driving voltages. The LUT is merely an example. It should be understood that there may be another correspondence between the control code and the driving voltage. This is not limited in this application.

TABLE 1

| Control code | Driving voltage |
|---|---|
| 00001 | −4.0 V |
| 00100 | −3.2 V |
| 01000 | −2.4 V |

In a possible design, if second temperature values of the LED display collected by a plurality of temperature sensors are received in step S601, the first temperature value is determined based on the second temperature values that are respectively collected by the plurality of temperature sensors. Specifically, includes but is not limited to the following three manners. In other words, this application may further include another manner of determining the first temperature value in addition to the following three manners. This is not exhaustive herein.

Manner 1: Use a minimum temperature value among the second temperature values that are respectively collected by the plurality of temperature sensors as the first temperature value.

Manner 2: Use an average value of the second temperature values that are respectively collected by the plurality of temperature sensors as the first temperature value.

Manner 3: Use a temperature value obtained through weighted summation of the second temperature values that are separately collected by the plurality of temperature sensors as the first temperature value.

In a possible design, each pixel circuit further includes a positive metal-oxide semiconductor field-effect transistor. A cathode of the first light-emitting diode is connected to the power supply unit. An anode of the first light-emitting diode is connected to a source of the positive metal-oxide semiconductor field-effect transistor. That based on the target operating voltage, determine a driving voltage that is applied by the power supply unit to the first pixel circuit includes: Based on the target operating voltage, determine a driving voltage that is applied by the power supply unit to the cathode of the first light-emitting diode in the first pixel circuit.

In a possible design, each pixel circuit further includes a negative metal-oxide semiconductor field-effect transistor. An anode of the first light-emitting diode is connected to the power supply unit. A cathode of the first light-emitting diode is connected to a drain of the negative metal-oxide semiconductor field-effect transistor. That based on the target operating voltage, determine a driving voltage that is applied by the power supply unit to the first pixel circuit includes: Based on the target operating voltage, determine a driving voltage that is applied by the power supply unit to the anode of the first light-emitting diode in the first pixel circuit.

An embodiment of this application further provides a computer-readable storage medium. The computer-readable storage medium stores computer instructions. When the computer instructions are executed, the method in any design of the foregoing driving method for the LED display may be performed.

An embodiment of this application further provides a computer program product including computer instructions. When the computer instructions are executed, the method in any design of the foregoing driving method for the LED display may be performed.

To be specific, each aspect of the driving method for the LED display provided in this application may be alternatively implemented in a form of a program product, and the program product includes program code. When the program code is run on a computer device or a circuit product, the program code is used to enable the computer device to perform the steps in the driving method for the LED display described in this specification.

In addition, although the operations of the method in this application are described in a particular order in the accompanying drawings, this does not require or imply that these operations need to be performed in the particular order, or that all the operations shown need to be performed to achieve the desired results. Additionally or alternatively, some steps may be omitted, a plurality of steps may be combined into one step for execution, and/or one step may be broken down into a plurality of steps for execution.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that the computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine. In this way, the instructions, when executed by the processor of the computer or the another programmable data processing device, generate an apparatus for implementing functions specified in one or more processes in the flowcharts and/or in one or more blocks in the block diagrams.

Alternatively, these computer program instructions may be stored in a computer-readable memory that can indicate a computer or another programmable data processing device to work in a specific manner. In this way, the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that the person skilled in the art can make various modifications and variations to this application without departing from the scope of this application. This application is intended to cover these modifications and variations provided that these modifications and variations in this application fall within the scope of the claims and their equivalent technologies of this application.

What is claimed is:

1. A driving apparatus for a light-emitting diode (LED) display, wherein the driving apparatus comprises:

a power supply unit configured to provide a driving voltage for an LED in each pixel circuit in the LED display, wherein the LED display is different than an organic light-emitting diode (OLED) display;

a temperature sensor configured to collect a first temperature value of the LED display, wherein the first temperature value represents an average temperature value of at least one pixel circuit in the LED display; and a control unit coupled to the power supply unit and configured to control, based on the first temperature value, the power supply unit to dynamically adjust the driving voltage that is applied to the LED in each pixel circuit.

2. The driving apparatus according to claim 1, wherein:

each pixel circuit further comprises a current generation unit and a metal-oxide semiconductor field-effect transistor that are separately connected in series to the LED;

the current generation unit is configured to provide a constant current for the pixel circuit; and the metal-oxide semiconductor field-effect transistor is configured to control the LED to be in a conducted state or a cut-off state.

3. The driving apparatus according to claim 2, wherein the control unit is specifically configured to:

determine, based on the first temperature value and a preset curve relationship between a temperature value and an operating voltage of the LED, a target operating voltage corresponding to a first LED in a first pixel circuit in the LED display; and determine, based on the target operating voltage, a driving voltage that is applied by the power supply unit to the first pixel circuit.

4. The driving apparatus according to claim 3, wherein the preset curve relationship between the temperature value and the operating voltage of the LED is a linear relationship.

5. The driving apparatus according to claim 4, wherein when the metal-oxide semiconductor field-effect transistor is a positive metal-oxide semiconductor field-effect transistor, a cathode of the first LED is connected to the power supply unit, and an anode of the first LED is connected to a source of the positive metal-oxide semiconductor field-effect transistor; and wherein the control unit is specifically configured to:

determine, based on the target operating voltage, a driving voltage that is applied by the power supply unit to the cathode of the first LED in the first pixel circuit.

6. The driving apparatus according to claim 4, wherein when the metal-oxide semiconductor field-effect transistor is a negative metal-oxide semiconductor field-effect transistor, an anode of the first LED is connected to the power supply unit, and a cathode of the first LED is connected to a drain of the negative metal-oxide semiconductor field-effect transistor; and wherein the control unit is specifically configured to:

determine, based on the target operating voltage, a driving voltage that is applied by the power supply unit to the anode of the first LED in the first pixel circuit.

7. The driving apparatus according to claim 1, wherein there are a plurality of temperature sensors, and the plurality of temperature sensors are separately disposed at different positions on the LED display.

8. The driving apparatus according to claim 7, wherein when there are two temperature sensors, the two temperature sensors are respectively disposed at diagonal positions on the LED display; or wherein when there are four temperature sensors, the four temperature sensors are respectively disposed at four corners of the LED display.

9. A driving method for a light-emitting diode (LED) display, wherein the method comprises:

receiving a first temperature value of the LED display collected by a temperature sensor, wherein the first temperature value represents an average temperature value of at least one pixel circuit in the LED display, wherein the LED display is different than an organic light-emitting diode (OLED) display; and controlling, based on the first temperature value, a power supply unit to dynamically adjust a driving voltage that is applied to an LED in each pixel circuit in the LED display.

10. The driving method according to claim 9, further comprising:

providing a constant current for each pixel circuit; and controlling the LED to be in a conducted state or a cut-off state.

11. The driving method according to claim 9, further comprising:

determining, based on the first temperature value and a preset curve relationship between a temperature value and an operating voltage of the LED, a target operating voltage corresponding to a first LED in a first pixel circuit in the LED display; and determining, based on the target operating voltage, a driving voltage that is applied by the power supply unit to the first pixel circuit.

12. The driving method according to claim 11, wherein the preset curve relationship between the temperature value and the operating voltage of the LED is a linear relationship.

13. A light-emitting diode (LED) display comprising a plurality of pixel circuits and a driving apparatus connected to the plurality of pixel circuits, wherein the driving apparatus comprises:

a power supply unit configured to provide a driving voltage for an LED in each pixel circuit in the LED display, wherein the LED display is different than an organic light-emitting diode (OLED) display;

a temperature sensor configured to collect a first temperature value of the LED display, wherein the first temperature value represents an average temperature value of at least one pixel circuit in the LED display; and a control unit coupled to the power supply unit and configured to control, based on the first temperature value, the power supply unit to dynamically adjust the driving voltage that is applied to the LED in each pixel circuit.

14. The LED display according to claim 13, wherein:

each pixel circuit further comprises a current generation unit and a metal-oxide semiconductor field-effect transistor that are separately connected in series to the LED;

the current generation unit is configured to provide a constant current for the pixel circuit; and the metal-oxide semiconductor field-effect transistor is configured to control the LED to be in a conducted state or a cut-off state.

15. The LED display according to claim 14, wherein the control unit is configured to:

determine, based on the first temperature value and a preset curve relationship between a temperature value and an operating voltage of the LED, a target operating voltage corresponding to a first LED in a first pixel circuit in the LED display; and determine, based on the target operating voltage, a driving voltage that is applied by the power supply unit to the first pixel circuit.

16. The LED display according to claim 15, wherein the preset curve relationship between the temperature value and the operating voltage of the LED is a linear relationship.

17. The LED display according to claim 16, wherein when the metal-oxide semiconductor field-effect transistor is a positive metal-oxide semiconductor field-effect transistor, a cathode of the first LED is connected to the power supply unit, and an anode of the first LED is connected to a source of the positive metal-oxide semiconductor field-effect transistor; and wherein the control unit is specifically configured to:

determine, based on the target operating voltage, a driving voltage that is applied by the power supply unit to the cathode of the first LED in the first pixel circuit.

18. The LED display according to claim 16, wherein when the metal-oxide semiconductor field-effect transistor is a negative metal-oxide semiconductor field-effect transistor, an anode of the first LED is connected to the power supply unit, and a cathode of the first LED is connected to a drain of the negative metal-oxide semiconductor field-effect transistor; and wherein the control unit is specifically configured to:

determine, based on the target operating voltage, a driving voltage that is applied by the power supply unit to the anode of the first LED in the first pixel circuit.

19. The LED display according to claim 13, wherein there are a plurality of temperature sensors, and the plurality of temperature sensors are separately disposed at different positions on the LED display.

20. The LED display according to claim 19, wherein when there are two temperature sensors, the two temperature sensors are respectively disposed at diagonal positions on the LED display; or wherein when there are four temperature sensors, the four temperature sensors are respectively disposed at four corners of the LED display.

* * * * *